United States Patent
Robles-Kelly

(10) Patent No.: US 10,360,661 B2
(45) Date of Patent: Jul. 23, 2019

(54) DETERMINING MULTISPECTRAL OR HYPERSPECTRAL IMAGE DATA

(71) Applicant: National ICT Australia Limited, Eveleigh, NSW (AU)

(72) Inventor: Antonio Robles-Kelly, Eveleigh (AU)

(73) Assignee: National ICT Australia Limited, Eveleigh, NSW (AU)

( * ) Notice: Subject to any disclaimer, the term of this patent is extended or adjusted under 35 U.S.C. 154(b) by 82 days.

(21) Appl. No.: 15/565,339

(22) PCT Filed: Apr. 15, 2016

(86) PCT No.: PCT/AU2016/050277
§ 371 (c)(1),
(2) Date: Oct. 9, 2017

(87) PCT Pub. No.: WO2016/164982
PCT Pub. Date: Oct. 20, 2016

(65) Prior Publication Data
US 2018/0061004 A1 Mar. 1, 2018

(30) Foreign Application Priority Data
Jan. 15, 2016 (AU) ................. 2016900117

(51) Int. Cl.
*H04N 7/18* (2006.01)
*G06T 3/40* (2006.01)
(Continued)

(52) U.S. Cl.
CPC .......... *G06T 3/4015* (2013.01); *G06F 17/175* (2013.01); *H04N 5/332* (2013.01); *H04N 9/045* (2013.01)

(58) Field of Classification Search
CPC ...... G06T 3/4015; H04N 9/045; H04N 5/332; G06F 17/175
(Continued)

(56) References Cited

U.S. PATENT DOCUMENTS

2008/0292194 A1* 11/2008 Schmidt ............... G06T 7/0012
382/217
2010/0013979 A1* 1/2010 Golub .................. G01J 3/2803
348/340

FOREIGN PATENT DOCUMENTS

WO WO2013/063655 A1 5/2013

OTHER PUBLICATIONS

Baussard, A. et al., *Adaptive B-spline scheme for solving an inverse scattering problem*, Institute of Physics Publishing, Inverse Problems, 20 (2004) pp. 347-365.
(Continued)

*Primary Examiner* — Richard T Torrente
(74) *Attorney, Agent, or Firm* — Kilpatrick Townsend & Stockton LLP

(57) ABSTRACT

This disclosure concerns the determination of electronic multispectral or hyperspectral images, such as by a processor in a camera. The processor receives first image sensor signals that are associated with a first wavelength and with multiple first imaging elements at respective first imaging element locations. The processor determines a spline approximation to the first image sensor signals across the first imaging element locations and determines the multispectral or hyperspectral image data by interpolating the spline approximation at the pixel location. Finally, the image data is stored on a data store. Using splines to interpolate the image sensor signals outperforms other methods, which means increased image quality due to more accurate interpolation. More specifically, using splines leads to a more
(Continued)

accurate spectrum at each point and reduced spectral error compared to other methods.

15 Claims, 6 Drawing Sheets

(51) Int. Cl.
    *G06F 17/17*     (2006.01)
    *H04N 5/33*     (2006.01)
    *H04N 9/04*     (2006.01)
(58) Field of Classification Search
    USPC .......................................................... 348/164
    See application file for complete search history.

(56) References Cited

OTHER PUBLICATIONS

Cusimano, C. et al., *Circular Bernstein-Bezier spline approximation with knot removal*, Journal of Computational and Applied Mathematics 155 (2003) pp. 177-185.
Feng, Y. et al., *Mitigation of spectra mis-registration effects in imaging spectrometers via cubic spline interpolation*, The State Key Laboratory of Applied Optics, Changchun Institute of Optics, Fine Mechanics and Physics, Jilin Changchun,130033, Sep. 2008, 9 pages.
Szeliski, R. et al., *Spline-based image registration*, International Journal of Computer Vision 22(3), (1997), pp. 199-218.
International Search Report and Written Opinion corresponding to PCT/AU2016/050277, dated May 20, 2016, 10 pages.

* cited by examiner

Spectrum of pixel 1:

Algorithm 1 $Interpolate(X, \{R_v\}, p)$

Require: $x, R, p$ $X$: The vector of sampled rows, columns or wavelengths, where $X = [x_1, \ldots, x_l]^T$ $\{R_v\}$: A collection of image data samples, where $R_{v,k}$ is the image irradiance at the $k^{th}$ row,
  column or wavelength of the sensor with index $v$, $k = 1, \ldots, l$.

$p$: The degree of the basis functions.

1: $l \leftarrow$ the number of samples
2: $N \leftarrow$ the number of data vectors
3: $m \leftarrow l + p + 1$ // $l$ is also the number of control points per interpolating curve
4: for Data vector with index $v$ do
5: $\quad d_v \leftarrow \sum_{k=2}^{l}((R_{v,k} - R_{v,k-1})^2 + (x_k - x_{k-1})^2)^{\frac{1}{2}}$
6: $\quad$ Compute the parameters values $\bar{t}_{v,k}$, where $k = 1, \ldots, l$, such that $\bar{t}_{v,1} = 0, \bar{t}_{v,l} = 1$, and
$\quad \bar{t}_{v,k} = \bar{t}_{v,k-1} + \frac{((R_{v,k} - R_{v,k-1})^2 + (x_k - x_{k-1})^2)^{\frac{1}{2}}}{d_v}$, where $k = 2, \ldots, l$.
7: end for
8: $t_k \leftarrow \frac{1}{N}\sum_v \bar{t}_{v,k} \forall k = 1 \ldots l$
   //Compute the common knot vector for all the data vectors
9: $u_k = 0 \forall k = 1, \ldots, p+1, u_k = 1 \forall k = m - p, \ldots, m$
10: $u_{k+p} = \frac{1}{p}\sum_{i=k}^{k+p-1} t_k \forall k = 2, \ldots, l - p$
11: $U \leftarrow [u_1, \ldots, u_m]^T$ //The knot vector
12: Initialise $A$ to a zero-valued array of size $l \times l$
13: for $k \leftarrow [1 \ldots l]$ do
14: $\quad span \leftarrow FindSpan(l, p, t_k, U)$
15: $\quad A[k][span - p \ldots span] \leftarrow BasisFunctions(span, t_k, p, U)$
16: end for
   //$\tau$: the coordinates of control points common to all the vectors.
17: $\tau \leftarrow$ the solution to $Ax = A$
18: for Data with index $v$ do
19: $\quad y_v \leftarrow$ the solution to $Ay_v = R_v$, where $R_v = [R_{v,1}, R_{v,2}, \ldots, R_{v,l}]^T$ //$y_v$: the coordinates of
   the data vector with index $v$.
20: end for
21: return $U, \tau, y_v \forall v$

Fig. 6

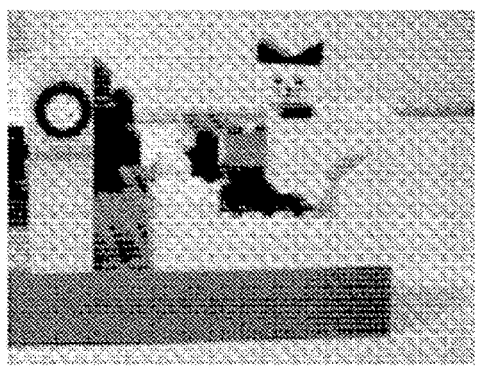
Fig. 7a  Input raw image
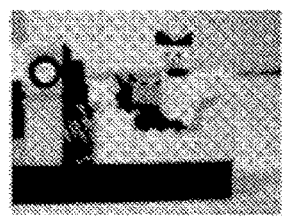    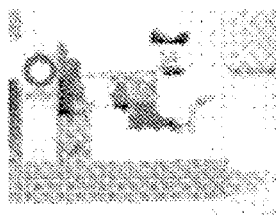    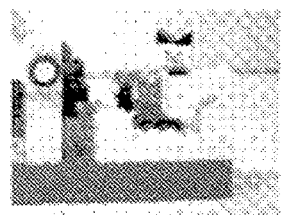
Fig. 7b  505nm   Fig. 7c  549nm   Fig. 7d  603nm
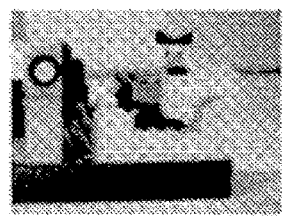    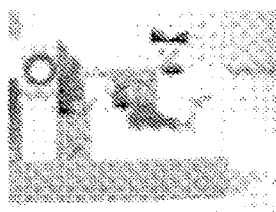    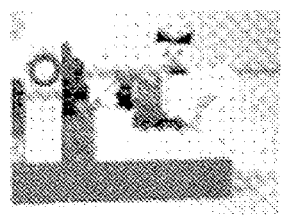
Fig. 7e  500nm   Fig. 7f  550nm   Fig. 7g  600nm
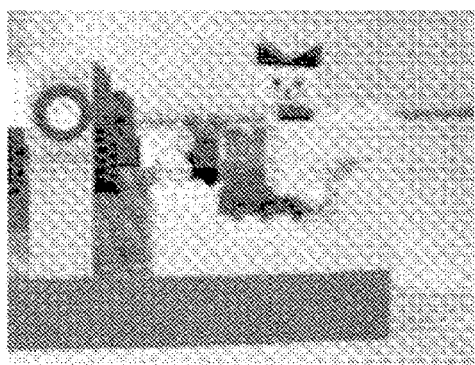
Fig. 7h  Output pseudocolour image

DETERMINING MULTISPECTRAL OR HYPERSPECTRAL IMAGE DATA

TECHNICAL FIELD

The disclosure concerns the determination of electronic images, such as multispectral or hyperspectral or multispectral images. In particular the invention concerns, but is not limited to, methods, software and computer systems for determining multispectral or hyperspectral image data for a pixel location from image sensor signals also referred to as demosaicing.

BACKGROUND ART

The development of image sensor technology has made it possible to capture image data in hundreds of bands covering a broad spectrum. In contrast with trichromatic images, multispectral and hyperspectral imaging offer an information-rich representation of the scene due to their capability to capture imagery across many bands covering the visible and near infrared segments of the light spectrum. As a remote sensing tool, multispectral and hyperspectral imaging can used in aerial imaging, for example. Imaging spectroscopy has found many challenges and opportunities for terrestrial applications including colour reproduction, material recognition and shape recovery. Applications of spectral imaging in colorimetry include digital archiving of art and historical documents, textile production, printing and high dynamic range imaging.

Remote sensing imaging technologies coexist with ground-based systems based on liquid crystal tunable filters (LCTFs), acousto-optic tunable filters (AOTF), Fabry-Perot imagers and multiple-CCD cameras. These technologies comprise the staring arrays, pushbroom and multiple CCD spectral cameras.

One important aspect in acquiring images is the recovery of a hyperspectral or multispectral image from an on-chip filter array akin to the Bayer patterns, i.e. an array of of red-green and green-blue filters overlaid in alternating rows on the CCD or CMOS image sensor. For some sensors this filter array comprises multiple filters, often with spectral sensitivity functions comprising an exclusive wavelength range.

The process of de-Bayering, i.e. the recovery of a full colour image from the incomplete data delivered by a Bayer array, may employ green-red and green-blue filter cross talk or fixed ratios between the green and the other two colour channels. This is important since the cross-talk between filters overlaid on larger patterns may be quite low. This, in turn, implies that the correlation between the filters is difficult to be employed in a way similar to that often applied to de-Bayering approaches. Further, the spatial proximity between similar filters on the sensor can be much greater than in Bayer arrays.

FIG. 1a illustrates an RGB Bayer pattern 100, where '1' represents a blue filter, '2' represents a green filter and '3' represents a red filter. These three colours may also be referred to as three bands.

FIG. 1b illustrates a 3×3 multispectral filter pattern 150 with nine different bands 1-9. Note that, for the green filters (labelled '2') on the Bayer array 100, there is always another similar (green) filter which is adjacent. This, together with the correlation of the green channel with both, the red and blue ones, is the basis for the practice to interpolate the green channel first and, later on, do likewise with the red and blue channels.

In contrast, the 9-filter overlay 150 has no similar adjacent filter. Moreover, in addition to the distance between similar filters being much greater, the negligible cross-talk does not hint at any interpolation sequence or provides any ratios that can be used to constrain the demosaicing process (de-Bayering may also use the fact that the red-green to blue-green ratio should remain constant).

Further, for multispectral and hyperspectral images, the main focus is in spectra representation. This is, the modelling of the sampled spectra as a linear combination of a small basis set.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

There is provided a method for determining multispectral or hyperspectral image data for a pixel location from first image sensor signals. The first image sensor signals are associated with a first wavelength and with multiple first imaging elements at respective first imaging element locations. The method comprises:

determining a spline approximation to the first image sensor signals across the first imaging element locations;

determining the multispectral or hyperspectral image data by interpolating the spline approximation at the pixel location; and storing the multispectral or hyperspectral image data on a data store.

Using splines to interpolate the image sensor signals outperforms other methods, which means increased image quality due to more accurate interpolation. More specifically, using splines leads to a more accurate spectrum at each point and reduced spectral error compared to other methods.

Determining the spline approximation may comprises determining a set of control points based on a knot vector.

The method may further comprise reducing the number of control points or elements of the knot vector or both.

It is an advantage that the file size can be reduced by reducing the number of the control points or elements of the knot vector of the spline approximation.

The method may further comprise determining the knot vector based on the first sensor signals.

The first sensor signals may relate to multiple rows and multiple columns, and determining the spline approximation to the first image sensor signals may comprise:

(a) determining a set of control points of a two-dimensional spline approximation to each of the multiple rows of sensor signals, and (b) determining a set of control points of a two-dimensional spline approximation to each of the multiple columns of the sensor signals.

It is an advantage that the computational complexity is reduced by determining two two-dimensional spline approximations compared to a single three dimensional ("surface") approximation.

Steps (a) and (b) may be based on the same knot vector.

Interpolating the spline approximation at the first pixel location may comprise sequentially performing the steps of
(i) interpolating the two-dimensional spline approximation to one or more of the multiple rows of the first sensor signals; and
(ii) interpolating the two-dimensional spline approximation to one or more of the multiple columns of the first sensor signals.

Interpolating the spline approximation may comprise sequentially repeating the steps (i) and (ii) until a convergence criterion is met.

The method may further comprise:
repeating the steps of determining a spline approximation, determining the multispectral or hyperspectral image data and storing the multispectral or hyperspectral image data for further image sensor signals being associated with multiple further imaging elements at respective further imaging element locations associated with multiple further wavelengths.

Determining the spline approximation to the image sensor signals may comprise:
(c) determining a set of control points of a two-dimensional spline approximation to a spectrum at each pixel location.

Determining the spline approximation to the image sensor signals may comprise:
the sensor signals relate to multiple rows and multiple columns, and
determining the spline approximation to the image sensor signals may comprise:
(a) determining a set of control points of a two-dimensional spline approximation to each of the multiple rows of sensor signals,
(b) determining a set of control points of a two-dimensional spline approximation to each of the multiple columns of the sensor signals, and
(c) determining a set of control points of a two-dimensional spline approximation to a spectrum at each pixel location It is an advantage that the computational complexity is reduced by determining three two-dimensional spline approximations compared to a single four dimensional approximation.

Steps (a), (b) and (c) may be based on the same knot vector.

Using a common knot vector the continuity, differentiability and local support properties of these basis functions enable further functional analysis of the image data. Further, this opens-up the possibility of effecting tasks such as compression, whereby the spectrum at each pixel is represented by a number of control points and a common knot vector which act as a global parameter in each image or a collection of spectra. In this manner, a hyperspectral image, which may comprise tens or hundreds of bands, can be reduced to much fewer control points with a shared knot vector.

Software, when executed by the computer, causes the computer to perform the method of any one of the preceding claims.

There is provided a computer system for determining multispectral or hyperspectral image data for a pixel location. The computer system comprises:

an input port to receive image sensor signals, the image sensor signals being associated with a first wavelength and with multiple imaging elements at respective imaging element locations;
a data store; and
a processor to:
determine a spline approximation to the image sensor signals across the imaging element locations,
determine the multispectral or hyperspectral image data by interpolating the spline approximation at the pixel location, and
store the multispectral or hyperspectral image data on the data store.

A multispectral or hyperspectral camera comprises:
an image sensor to generate image sensor signals, the image sensor signals being associated with a first wavelength and with multiple imaging elements at respective imaging element locations;
an image store; and
a processor to:
determine a spline approximation to the image sensor signals across the imaging element locations,
determine multispectral or hyperspectral image data by interpolating the spline approximation at each of multiple pixel locations and at each of multiple wavelengths for each pixel location, and
store the multispectral or hyperspectral image data on the image store.

Optional features described of any aspect of method, computer readable medium or computer system, where appropriate, similarly apply to the other aspects also described herein.

BRIEF DESCRIPTION OF DRAWINGS

FIG. 1b illustrates a 3×3 multispectral filter pattern.
An example will now be described with reference to:
FIG. 6 illustrates an algorithm for the global interpolation of B-Splines.
FIG. 7a illustrates an input 16-channel raw image.
FIGS. 7b to 7d illustrate respective sample wavelength-indexed bands yielded by the interpolation in the spatial domain.
FIGS. 7e to 7g illustrate respective sample bands after the interpolation in the wavelength domain.
FIG. 7h illustrates an interpolated output image.

BEST MODE FOR CARRYING OUT THE INVENTION

This disclosure provides a method for demosaicing imagery acquired with large filter arrays overlaid on CCDs and CMOS image sensors. The current approach may be based upon the use of splines so as to interpolate the multispectral or hyperspectral image in either or both, the spatial or spectral domain. The method presented here is general in nature, being able to operate on filters with negligible cross talk, interpolate and resample the spectra in the wavelength domain and recovery a full hyperspectral or multispectral image from the incomplete data delivered by the filter array.

The proposed approach may employ a set of basis functions for the interpolation of arbitrary wavelength-dependent spectral data. This is in contrast with representation approaches, which depart from the assumption that the data is available and full and attempt to compress or encode the data rather than interpolate it.

Moreover, some other descriptors do not allow for spectra interpolation being rather limited to regression tasks. Here there is a twofold interpolation problem spanning the spatial (the sensor pixel-sites) and the spectral domain. As a result, is is possible to use splines rather than linear models. As opposed to other basis functions, Splines possess a number of suitable properties for the representation of spectral data. Due to their local support property, noise corruption in the input data only affects a local spectral neighborhood of the representation. As a result, the approach presented here is robust to noise and local perturbations in the spectra. More importantly, other choices of basis functions can be made. This is an added advantage of our method, whereby the interpolation can be done using a variety of basis functions which may yield better results in different settings.

Figure 2:
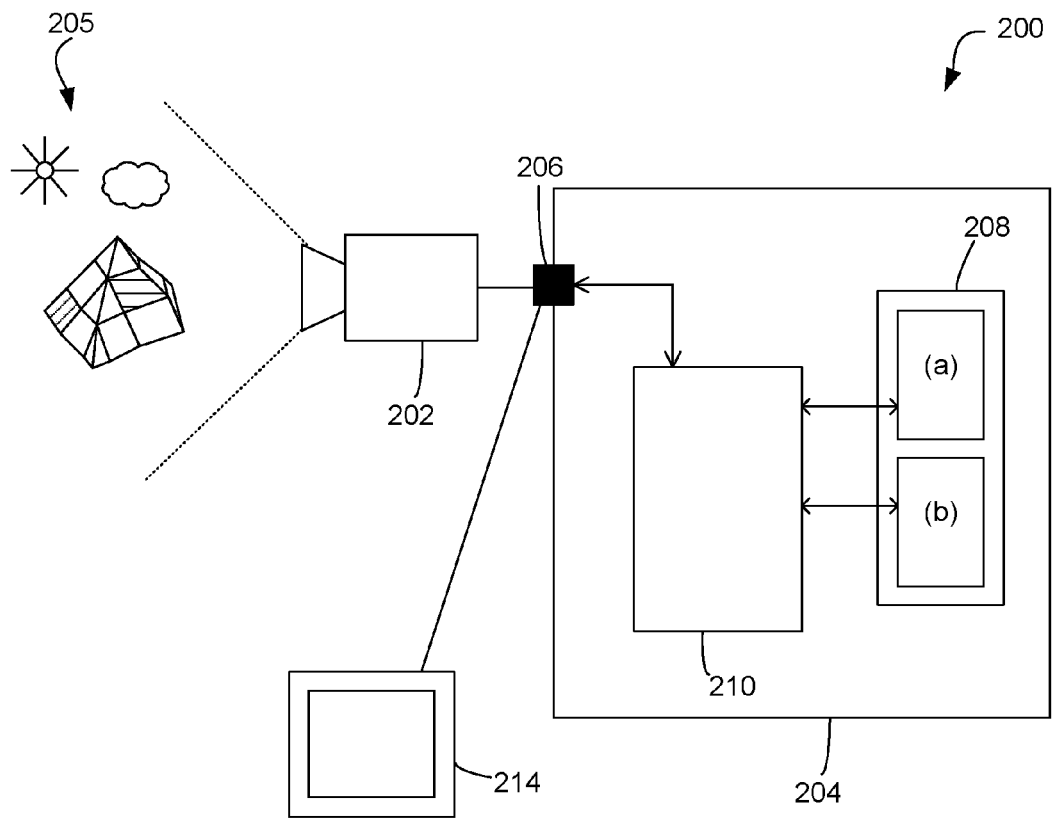
FIG. 2 illustrates a computer system for determining multispectral or hyperspectral image data.

FIG. 2 illustrates a computer system 200 for determining multispectral or hyperspectral image data for a pixel location from image sensor signals. Computer system 200 comprises a sensor 202 and a computer 204. In this example the sensor 202 is a hyperspectral or multispectral sensor directed at a scene 205.

In one example, the computer system 200 is integrated into a handheld device such as a consumer or surveillance camera and the scene 205 may be any scene on the earth, such as a tourist attraction or a person, or a remote surveillance scenario. The sensor 202 may have a number of bands that balances computational costs with accuracy. The sensor 202 may have as low as four bands and as high as hundreds. In one example, sensor 202 is a Fluxdata camera FD-1665-MS7.

The computer 204 receives sensor signals from the sensor 202 via a data port 206 and processor 210 stores the sensor signals in data memory 208(b). The processor 210 uses software stored in program memory 208(a) to perform the method shown in FIG. 3. The program memory 208(b) is a non-transitory computer readable medium, such as a hard drive, a solid state disk or CD-ROM.

Software stored on program memory 208(a) may cause processor 210 to generate a user interface that can be presented to the user on a monitor 212. The user interface is able to accept input from the user (i.e. touch screen). The monitor 212 provides the user input to the input/out port 206 in the form of interrupt and data signals. The sensor data and the multispectral or hyperspectral image data may be stored in memory 208(b) by the processor 210. In this example the memory 208(b) is local to the computer 204, but alternatively could be remote to the computer 204.

The processor 210 may receive data, such as sensor signals, from data memory 208(b) as well as from the communications port 206. In one example, the processor 210 receives sensor signals from the sensor 202 via communications port 206, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 210 receives and processes the sensor data in real time. This means that the processor 210 determines multispectral or hyperspectral image data every time the image data is received from sensor 202 and completes this calculation before the sensor 202 sends the next sensor data update. This may be useful in a video application with a framerate of 60 fps.

Although communications port 206 is shown as single entity, it is to be understood that any kind of data port may be used to receive data, such as a network connection, a memory interface, a pin of the chip package of processor 210, or logical ports, such as IP sockets or parameters of functions stored on program memory 208(a) and executed by processor 210. These parameters may be stored on data memory 208(b) and may be handled by-value or by-reference, that is, as a pointer, in the source code.

The processor 210 may receive data through all these interfaces, which includes memory access of volatile memory, such as cache or RAM, or non-volatile memory, such as an optical disk drive, hard disk drive, storage server or cloud storage. The computer system 204 may further be implemented within a cloud computing environment, such as a managed group of interconnected servers hosting a dynamic number of virtual machines.

It is to be understood that any receiving step may be preceded by the processor 210 determining or computing the data that is later received. For example, the processor 210 determines the sensor data, such as by filtering the raw data from sensor 202, and stores the filtered sensor data in data memory 208(b), such as RAM or a processor register. The processor 210 then requests the data from the data memory 208(b), such as by providing a read signal together with a memory address. The data memory 208(b) provides the data as a voltage signal on a physical bit line and the processor 210 receives the sensor data via a memory interface.

Figure 3:
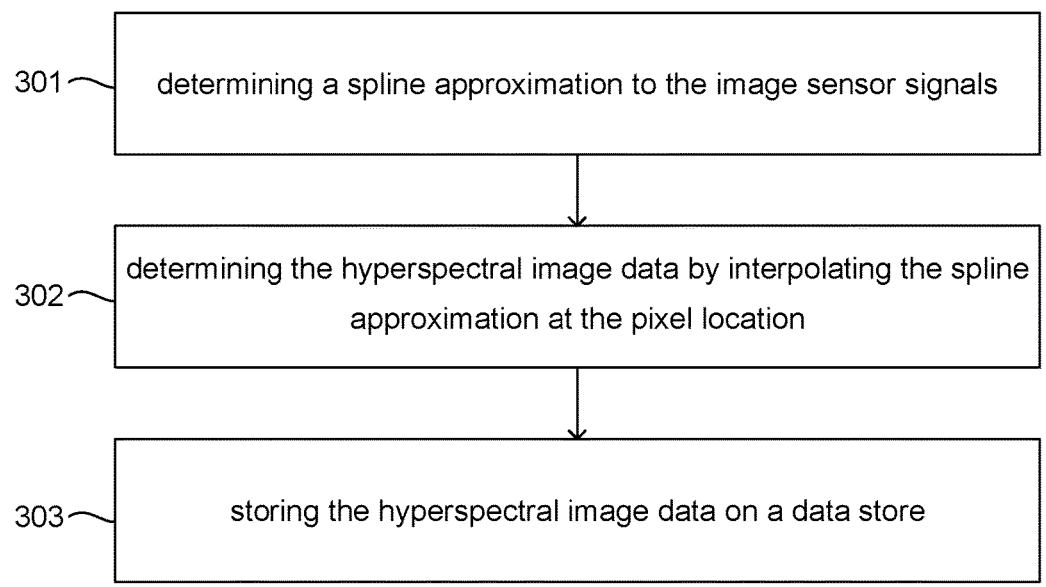
FIG. 3 illustrates a computer implemented method for determining multispectral or hyperspectral image data.

FIG. 3 illustrates a computer implemented method 300 for determining multispectral or hyperspectral image data for a pixel location from image sensor signals as performed by processor 210. Multispectral image data refers to image data with more than three bands but less than 10 bands, while hyperspectral image data refers to image data with 10 to 100 of bands or more.

Method 300 may serve as a blueprint or pseudo-code for software implemented in a particular programming language, such as C++, and stored on program memory 208(a) as compiled machine readable code. The following description provides an explanation of method 300 in general terms while a more detailed and more mathematical description follows afterwards.

Figure 1A:
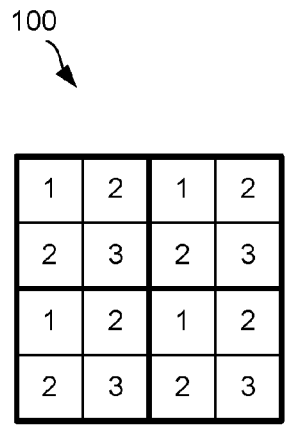
FIG. 1a illustrates an RGB Bayer pattern.

Processor 210 receives image sensor signals, which relates to the raw data from the sensor 202. As explained with reference to FIGS. 1a and 1b, the sensor 202 comprises multiple imaging elements and each of the imaging elements is associated with a particular wavelength band. That is, each imaging element is most sensitive over a particular range of wavelengths or a filter is most transparent over the particular range of wavelengths. This disclosure may refer to an intensity value associated with a particular wavelength instead of a band. In those cases, the wavelength represents the band in which the wavelength is located and the wavelength may refer to the wavelength of maximal sensitivity or maximal transparency or both. In other words, the image sensor signals represent for each imaging element the amount of light detected by that imaging element. In one example, the sensor signals comprise binary signals with 8 bit per imaging element. This means each image sensor signal has a value between 00000000 (black) and 11111111 (fully saturated colour).

After receiving the image sensor signals, processor 210 commences method 300 by determining 301 a spline approximation to the image sensor signals across the imaging element locations. In general, a spline approximation to the image sensor signals is a parametric representation of the image sensor signals. The approximation may be exact where the image sensor signals provide a value of measured radiance. In that case, the spline approximation approximates the transition between the measurement points where no measurements are available from the imaging elements. In other examples, the spline approximation may allow an approximation error between the measured data points and the parametric representation, that is, the spline.

The spline approximation may comprise a three-dimensional approximation for each wavelength 1-9 but may also comprise a four-dimensional approximation of all wavelengths in one approximation. In other examples, the spline approximation comprises separate two-dimensional splines for each column and for each row and for each wavelength, that is, r*c*n splines for r rows, c columns and n wavelengths. In other words, processor 210 determines a set of control points of a two-dimensional spline approximation to each of the multiple rows of sensor signals. Processor 210 further determines a set of control points of a two-dimensional spline approximation to each of the multiple columns of the sensor signals. Processor 210 then repeats this for each wavelength. The spline approximation is said to be 'across' the imaging element locations as the approximation spans the imaging element locations in a single parameterised representation. In other words, each row spline spans the entire width of the sensor chip while each column spline spans the entire height of the sensor chip.

Processor 210 then determines 302 the multispectral or hyperspectral image data by interpolating the spline approximation at the pixel location. It is noted here that the pixel location is in general different to the location on the imaging sensor where the radiance is measured. That is, the pixel location relates to a location where the data represents the entire spectrum. Therefore, the pixel location is generally different to the location of the imaging element on the image sensor. This is the reason why processor 210 performs interpolation to estimate the radiance at a pixel location (that is different to the measurement location). Processor 210 interpolates the spline approximation by evaluating the parametric representation at the pixel location. That is, processor 210 uses the pixel location as an input parameter value of the spline approximation and evaluates the spline approximation for that input value.

Processor 210 may perform the interpolation separately for each wavelength to generate the multispectral or hyperspectral image data. For example, for a particular pixel location processor 210 interpolates two splines for each wavelength and stores the result for each wavelength in a spectrum vector. Processor 210 may approximate this spectrum vector by a further spline approximation and store the corresponding set of control points on data store 208(b).

Figure 1B:
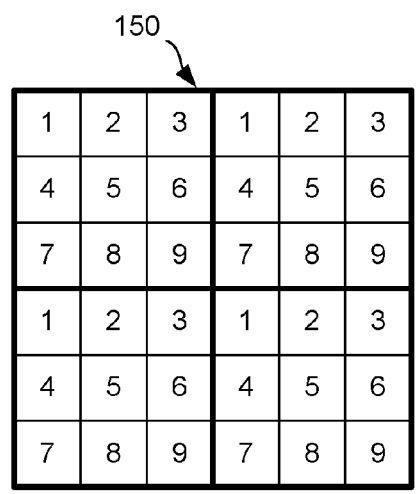
Figure 4A:
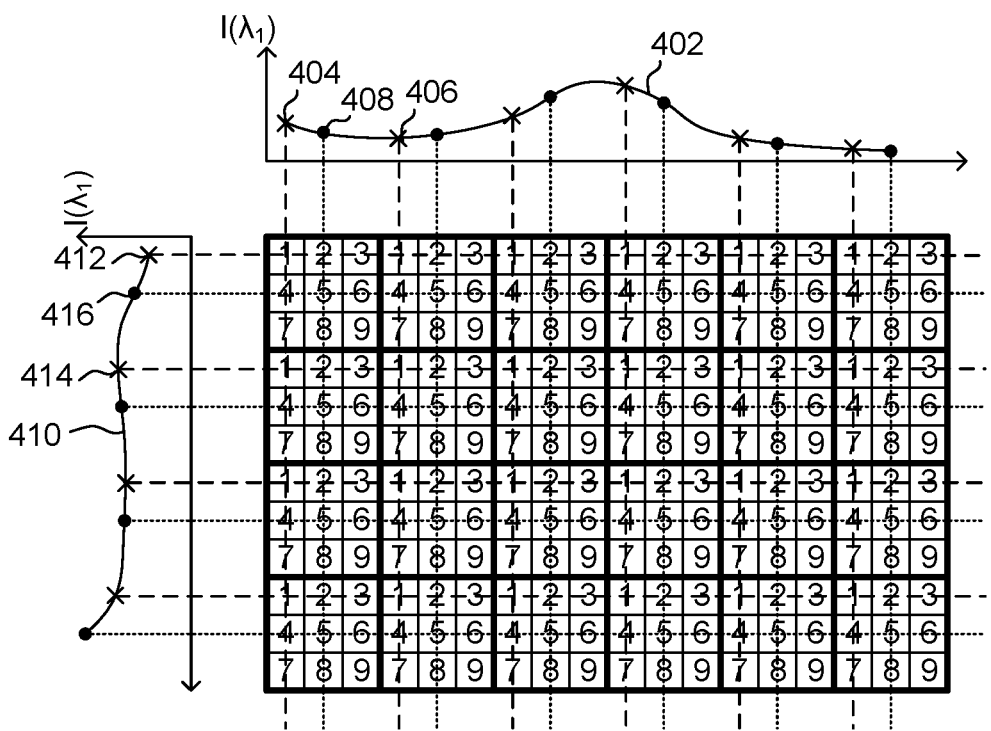
FIG. 4a illustrates the 3×3 filter pattern from FIG. 1b in more detail.

FIG. 4a illustrates the 3×3 filter pattern 150 from FIG. 1b in more detail. The different filters/bands are labelled 1-9 for each pixel for respective wavelength bands 1-9. Filter '1' may be a green filter and is used as an example where the locations of filter '1' are indicated by dashed lines. A first spline curve 402 represents the sensor signals for band 1 across the top row. Points 404 and 406 are measured intensities (represented by the image sensor signals) and point 408 is interpolated at the desired pixel location, which is generally indicated by dotted lines. In this example, the pixel location is where the number '5' is located in the top left square.

Similarly, the sensor signals for band 1 along the left column are represented by a second spline 410 with measured intensities 412 and 414 and interpolated point 416 in between. Processor 120 may calculate the average of the interpolated row value 408 and column value 416 as the pixel value for wavelength '1'. Processor 120 repeats this process for bands 1-9 to determine a pixel value for each wavelength. The pixel values together form the multispectral or hyperspectral image data and represent a spectrum at each pixel location.

Figure 4B:
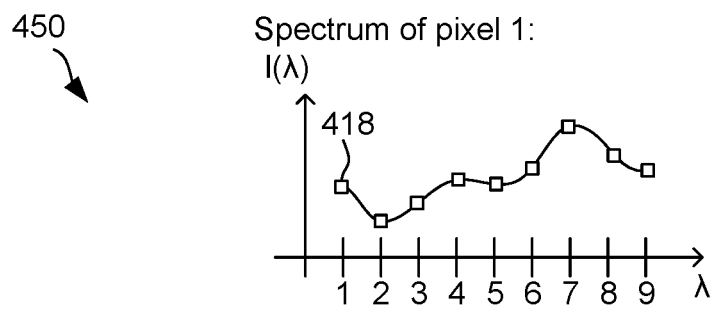
FIG. 4b illustrates an example spectrum at one pixel location.

FIG. 4b illustrates an example spectrum 450 of the top left pixel location as explained above. In the spectrum of the top left pixel (at the bottom of the figure), the intensity 418 at the first band is the average of 106 and 112 and the intensity across different wavelengths is represented by a further spline representation.

Figure 5A:
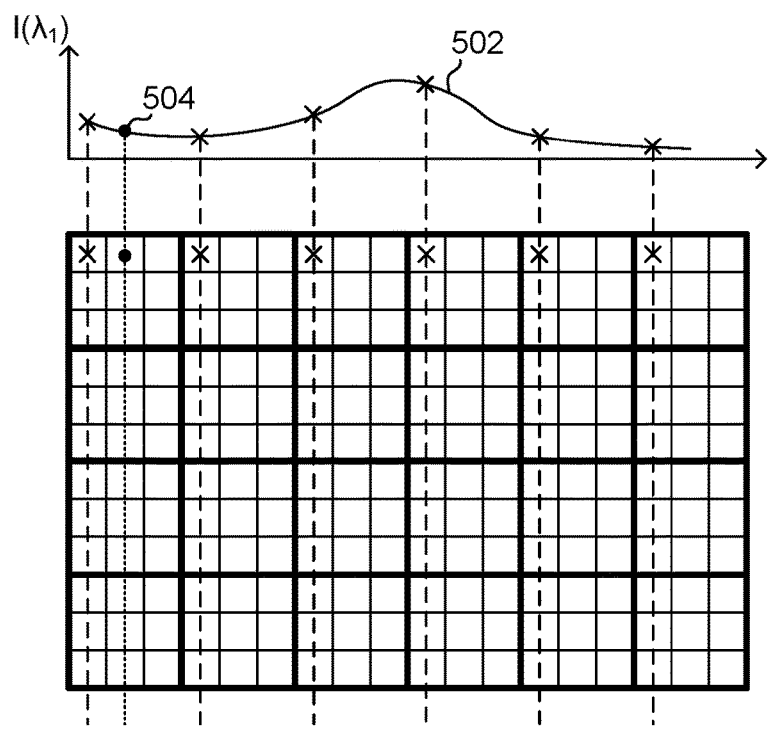
FIGS. 5a and 5b illustrate an example interpolation process.
Figure 5B:
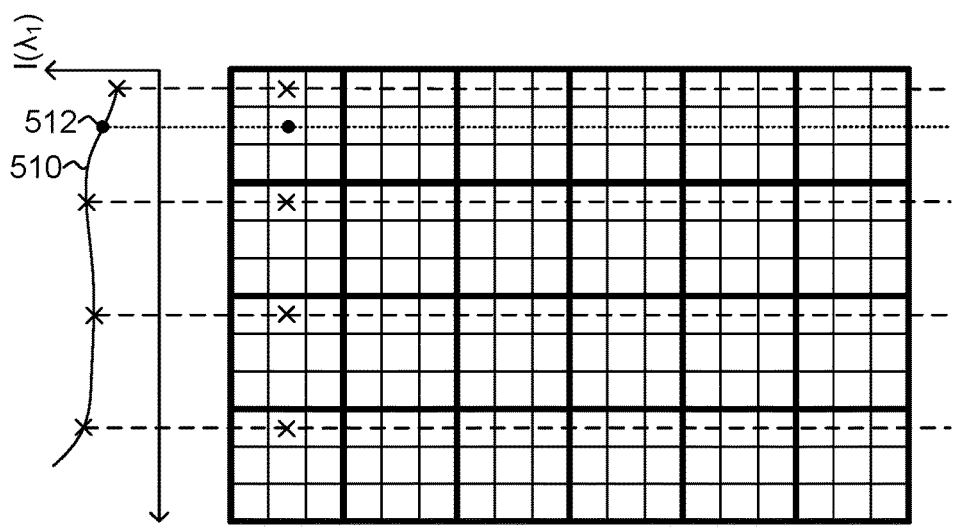

FIGS. 5a and 5b illustrate another example of the interpolation process where processor 120 processes rows first and then processes columns. The arrangement of imaging elements is identical to FIG. 5a but simplified for clearer illustration. FIG. 5a shows a first spline approximation 502 of the row values of filter '1' indicated by crosses (numbers are omitted for clarity). Processor 120 interpolates first spline approximation 502 to determine interpolated value 504 as indicated by a dot. As a result, the interpolated value 504 is an approximation of the intensity of wavelength '1' at the location of filter '2'. Processor 120 repeats the same process for each row to determine an intensity value for wavelength '1' for each row in the first column.

The result is shown in FIG. 5b where the values for wavelength '1' determined by interpolation in FIG. 5a are now indicated by crosses at locations of filter '2'. Processor 120 can then use these interpolated values to determine a second spline approximation 510 of interpolated values. Processor 210 then interpolates the second spline approximation 510 to determine an interpolated value 512. Processor 210 may repeat the process to calculate an interpolated value for each column and then again determine a row spline approximation as shown in FIG. 5a. Processor 210 may continually calculate and interpolate row and column spline approximation until the solution converges. That is, the process continues until the change between two successive values is less than a predetermined threshold, such as, less than two bits. In summary, processor 210 determines a horizontal interpolation towards the horizontal coordinate of the pixel location and then a vertical interpolation towards the vertical coordinate of the pixel location. Processor 210 may repeat these steps until convergence. Processor 210 may equally start with the column spline approximation 510 and then determine the row spline approximation 502. In effect, this may replace the average calculation explained with reference to FIG. 4a of interpolated points 408 and 416.

Processor 202 may employ a non-rational B-Spline representation for the above spline approximation to image sensor signals. The data points represented by the image sensor signals may be spectral measurements scattered across the image lattice as dictated by the filter array on the CCD or CMOS image sensor. It is worth noting in passing that the developments here apply to both, the spatial and spectral domain. The approach shown here can also be applied to other basis such as Lagrange polynomials, Bessel functions or those used for bicubic splines.

A spline function is one that has support with respect to degree, smoothness and domain partition. These properties make splines a flexible tool for fitting arbitrary shapes and three dimensional data. The smoothness property makes the interpolating curve robust to noise. The local support property permits the modification of the curve over a local section while keeping the rest of the Spline unaffected. The degree, on the other hand, permits the representation of complex shapes by altering the order of the basis functions.

The image data provided by the image sensor signals can be treated as functions of either wavelength or pixel-site row or column. Therefore, the concepts of B-Splines may be referred to in the two-dimensional case. A p-degree B-Spline curve C in $R^2$ composed of n segments is a function in the parameter domain U of the univariate variable t given by the linear combination $C(t)=\sum_{i=0}^{n} N_{i,p}(t)P_i$, where $P_i=(x_i, y_i)$ are the 2D control points, and $N_{i,p}(t)$ are the p-degree B-Spline basis functions defined on the parameter domain. The coordinates (x, y) of a point on the curve are expressed in the parametric form $$x(t) = \sum_{i=0}^{n} N_{i,p}(t)x_i \quad (1)$$

$$y(t) = \sum_{i=0}^{n} N_{i,p}(t)y_i$$

A B-Spline is characterised not only by the control points but also by a knot vector $U=\{u_0, \ldots, u_m\}$, where $m=n+p+1$. Processor 210 determines the control points and the knot vector and stores these values on data memory 208(b).

With these ingredients, we can define the $i^{th}$ B-Spline basis function $N_{i,p}(t)$ of degree p as follows $$N_{i,0}(t) = \begin{cases} 1 & if u_i \leq t < u_{i+1} \\ 0 & otherwise \end{cases} \quad (2)$$

$$N_{i,p}(t) = \frac{t - u_i}{u_{i+p} - u_i} N_{i,p-1}(t) + \frac{u_{i+p+1} - t}{u_{i+p+1} - u_{i+1}} N_{i+1,p-1}(t)$$

Note that the basis function $N_{i,p}(t)$ is a piecewise polynomial assuming non-zero values only on the interval $[u_i, u_{i+p+1})$. Therefore, it only governs the shape of the Spline in this local section.

Simultaneous Recovery of Multiple Image Measurements

Note that, following the notation above, processor 210 can process the data delivered by the sensor as vectors where the x(t) corresponds to row, column or wavelength indexes and y(t) accounts for the corresponding image irradiance measurement. These can be viewed as multiple vectors on similar domains, i.e. rows, columns or wavelengths.

We now extend the developments in the previous section to the derivation of a B-Spline representation for a given collection of image data samples. To do this, we enforce a common knot vector across all the input data as a hard constraint. This implies common B-Spline basis functions $N_{i,p}(t)$, $i=0, \ldots, n$, across the input spectra due to Equations 1 and 2. Under this constraint, the B-Spline representations are deemed to share the same set of wavelength, row or column coordinates $x_i$, $i=0, \ldots, n$.

The purpose of enforcing a common knot vector and a common B-Spline basis is twofold. Firstly, the continuity, differentiability and local support properties of these basis functions enable further functional analysis of the image data. Secondly, this opens-up the possibility of effecting tasks such as compression, whereby the spectrum at each pixel is represented by a number of control points and a common knot vector which act as a global parameter in each image or a collection of spectra. In this manner, a hyperspectral image, which may comprise tens or hundreds of bands, can be reduced to much fewer control points with a shared knot vector.

Let the input data be stored on data memory 204(b), as before, as a collection of measurements $\{R_v | R_v = [R_{v,1}, R_{v,2}, \ldots, R_{v,l}]^T\}$, where v denotes the pixel index and $R_{v,k}$ is the measured reflectance of the spectrum v at the image cube coordinate $\{x_k\}$, $k=1, \ldots, l$. Recall that the feature that renders each spectrum different from one another is the control point coordinates in the reflectance domain. Processor 210 aims to recover a B-Spline curve $C_v$ with control points $P_{v,i}=(x_i, y_{v,i})$, $i=0, \ldots, n$ for each spectrum index v, and a knot vector U common to all the data such that the coordinates of the curve are functions of an independent parameter t as $$x(t) = \sum_{i=0}^{n} N_{i,p}(t)x_i \quad (3)$$

$$R_v(t) = \sum_{i=0}^{n} N_{i,p}(t)y_{v,i}$$

In Equation 3, the basis functions $N_{i,p}(t)$ and the interpolation function x(t) may be the same for all the given spectra. The function $R_v(t)$ and its associated control point coordinates $y_{v,i}$ may vary with respect to the image data. Thus, the representation of this collection of vectors effectively consists of the knot vector U, the wavelength coordinates $[x_0, \ldots, x]^T$ and the reflectance coordinates $[y_{v,0}, \ldots, y_{v,n}]^T$ of the control points of the interpolating B-Splines.

Thus, to enforce a common knot vector across all the input spectra, processor 210 may performed a modified version of the global interpolation method in PIEGL, L., AND TILLER, W. The NURBS book. Springer-Verlag, London, U K, 1995, which is incorporated herein by reference.

FIG. 6 illustrates an Algorithm 600 for the global interpolation of B-Splines with a common knot vector to multiple reflectance spectra as stored on program memory 406(a) and performed by processor 210. At the beginning of Algorithm 600, processor 210 performs the centripetal method in LEE, E. T. Y.: Choosing nodes in parametric curve interpolation. Computer-Aided Design 21, 6 (1989), 363-370 (Lines 3-3) to compute parameter values $\bar{t}_{v,k}$ separately for each data vector. Note that the choice of the centripetal method is not exclusive and other methods may be used to compute these parameter values. After obtaining the average $t_k$ of these parameter values across all the spectral signatures, a common knot vector across all the input spectra is computed in Lines 3-3. The FindSpan(l,p,tk,U) procedure in Line 3 obtains the knot span index of $t_k$ using a binary search method. Subsequently, the BasisFunctions(span,$t_k$,p,U) procedure in Line 3 evaluates the basis functions at the parametric point $t_k$. In Lines 3 and 3, the control point coordinates are derived as linear least-squares solutions.

EXPERIMENTS

We now show example results for the demosaicing of a 16-band image delivered by a sensor with a filter array of size 4×4. Here, processor 210 has interpolated the data in the spatial domain first so as to later on do likewise across the wavelength. For the spatial interpolation, processor 210 has started with the rows which have non-null irradiance measurements and, once these have been interpolated, processor 210 processed the remaining rows using the interpolated points on the image lattice for further support. This process is repeated along the columns and, finally, a single value is obtained via averaging. For both, the spatial and wavelength domains we have enforced a single knot vector.

Its worth noting, however, that this procedure can be embodied in a number of different ways. For instance, interpolation across columns can be done in an interleaved fashion with respect to the rows. Also, robust statistics can be used to estimate the final value as an alternative to the average. The interpolation can be done without enforcing a unique knot vector. Wavelength measurements can even be resampled to new values (this is particularly useful for sensors that deliver measurements in non-regular wavelength increments).

In FIG. 7a we show a sample raw input image to our algorithm. The image is a 16 channel one in the visible spectrum whose bands are not regularly spaced across the spectrum. FIGS. 7b to 7d show three sample bands after the spatial interpolation is effected. FIGS. 7e to 7g show three resampled bands obtained by evaluating the spline interpolant at regular intervals in the wavelength domain. FIG. 7h shows the pseudocolour image as obtained using colour matching functions.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for determining multispectral or hyperspectral image data for a pixel location from first image sensor signals, the first image sensor signals being associated with a first wavelength and with multiple first imaging elements at respective first imaging element locations, the method comprising:

determining a spline approximation to the first image sensor signals across the first imaging element locations;

determining the multispectral or hyperspectral image data by interpolating the spline approximation at the pixel location; and storing the multispectral or hyperspectral image data on a data store; wherein the first sensor signals relate to multiple rows and multiple columns, and determining the spline approximation to the first image sensor signals comprises:
(a) determining a set of control points of a two-dimensional spline approximation to each of the multiple rows of sensor signals, and
(b) determining a set of control points of a two-dimensional spline approximation to each of the multiple columns of the sensor signals; wherein interpolating the spline approximation at the first pixel location comprises sequentially performing the steps of
(i) interpolating the two-dimensional spline approximation to one or more of the multiple rows of the first sensor signals; and
(ii) interpolating the two-dimensional spline approximation to one or more of the multiple columns of the first sensor signals; and wherein interpolating the spline approximation comprises sequentially repeating the steps (i) and (ii) until a convergence criterion is met.

2. The method of claim 1, wherein determining the spline approximation comprises determining a set of control points based on a knot vector.

3. The method of claim 2, further comprising reducing the number of control points or elements of the knot vector or both.

4. The method of claim 2, further comprising determining the knot vector based on the first sensor signals.

5. The method of claim 1, wherein
the first sensor signals relate to multiple rows and multiple columns, and
determining the spline approximation to the first image sensor signals comprises:
(a) determining a set of control points of a two-dimensional spline approximation to each of the multiple rows of sensor signals, and
(b) determining a set of control points of a two-dimensional spline approximation to each of the multiple columns of the sensor signals.

6. The method of claim 5, wherein steps (a) and (b) are based on the same knot vector.

7. The method of claim 5 wherein interpolating the spline approximation at the first pixel location comprises sequentially performing the steps of
(i) interpolating the two-dimensional spline approximation to one or more of the multiple rows of the first sensor signals; and
(ii) interpolating the two-dimensional spline approximation to one or more of the multiple columns of the first sensor signals.

8. The method of claim 7, wherein interpolating the spline approximation comprises sequentially repeating the steps (i) and (ii) until a convergence criterion is met.

9. The method of claim 1, further comprising:
repeating the steps of determining a spline approximation, determining the multispectral or hyperspectral image data and storing the multispectral or hyperspectral image data for further image sensor signals being associated with multiple further imaging elements at respective further imaging element locations associated with multiple further wavelengths.

10. The method of claim 1, wherein determining the spline approximation to the image sensor signals comprises:
(c) determining a set of control points of a two-dimensional spline approximation to a spectrum at each pixel location.

11. The method of claim 1, wherein determining the spline approximation to the image sensor signals comprises:
the sensor signals relate to multiple rows and multiple columns, and
determining the spline approximation to the image sensor signals comprises:
(a) determining a set of control points of a two-dimensional spline approximation to each of the multiple rows of sensor signals,
(b) determining a set of control points of a two-dimensional spline approximation to each of the multiple columns of the sensor signals, and
(c) determining a set of control points of a two-dimensional spline approximation to a spectrum at each pixel location.

12. The method of claim 11, wherein the steps (a), (b) and (c) are based on the same knot vector.

13. A non-transitory computer readable medium with an executable program stored thereon that when executed causes a computer to perform the method of claim 1.

14. A computer system for determining multispectral or hyperspectral image data for a pixel location, the computer system comprising:
an input port to receive image sensor signals, the image sensor signals being associated with a first wavelength and with multiple imaging elements at respective imaging element locations;
a data store; and
a processor to:
determine a spline approximation to the image sensor signals across the imaging element locations,
determine the multispectral or hyperspectral image data by interpolating the spline approximation at the pixel location, and
store the multispectral or hyperspectral image data on the data store; wherein
the sensor signals relate to multiple rows and multiple columns, and
determining the spline approximation to the image sensor signals comprises:
(a) determining a set of control points of a two-dimensional spline approximation to each of the multiple rows of sensor signals, and
(b) determining a set of control points of a two-dimensional spline approximation to each of the multiple columns of the sensor signals; wherein
interpolating the spline approximation at the first pixel location comprises sequentially performing the steps of
(i) interpolating the two-dimensional spline approximation to one or more of the multiple rows of the sensor signals; and
(ii) interpolating the two-dimensional spline approximation to one or more of the multiple columns of the sensor signals; and
wherein interpolating the spline approximation comprises sequentially repeating the steps (i) and (ii) until a convergence criterion is met.

15. A multispectral or hyperspectral camera comprising:
an image sensor to generate image sensor signals, the image sensor signals being associated with a first wavelength and with multiple imaging elements at respective imaging element locations;
an image store; and
a processor to:
determine a spline approximation to the image sensor signals across the imaging element locations,
determine multispectral or hyperspectral image data by interpolating the spline approximation at each of multiple pixel locations and at each of multiple wavelengths for each pixel location, and
store the multispectral or hyperspectral image data on the image store; wherein
the sensor signals relate to multiple rows and multiple columns, and
determining the spline approximation to the image sensor signals comprises:
(a) determining a set of control points of a two-dimensional spline approximation to each of the multiple rows of sensor signals, and
(b) determining a set of control points of a two-dimensional spline approximation to each of the multiple columns of the sensor signals; wherein
interpolating the spline approximation at the first pixel location comprises sequentially performing the steps of
(i) interpolating the two-dimensional spline approximation to one or more of the multiple rows of the sensor signals; and
(ii) interpolating the two-dimensional spline approximation to one or more of the multiple columns of the sensor signals; and
wherein interpolating the spline approximation comprises sequentially repeating the steps (i) and (ii) until a convergence criterion is met.

* * * * *